United States Patent [19]

Quek et al.

[11] Patent Number: 5,517,397
[45] Date of Patent: May 14, 1996

[54] FLYBACK POWER CONVERTER WITH SPIKE COMPENSATOR CIRCUIT

[75] Inventors: Eng H. Quek; Lai S. Chan, both of Singapore, Singapore

[73] Assignee: Astec International, Ltd., Hong Kong

[21] Appl. No.: 350,521

[22] Filed: Dec. 6, 1994

[51] Int. Cl.⁶ ................................................ H02M 3/335
[52] U.S. Cl. ............................ 363/21; 363/41; 363/56
[58] Field of Search ........................... 363/21, 41, 47, 363/48, 56

[56] References Cited

U.S. PATENT DOCUMENTS

| | | | |
|---|---|---|---|
| 4,680,688 | 7/1987 | Inou et al. | 363/21 |
| 5,005,112 | 4/1991 | Kuriyama | 363/21 |
| 5,008,794 | 4/1991 | Leman | 363/21 |
| 5,014,178 | 5/1991 | Balakrishnan | 363/49 |
| 5,377,091 | 12/1994 | Faulk | 363/21 |
| 5,400,239 | 3/1995 | Caine | 363/67 |

*Primary Examiner*—Peter S. Wong
*Assistant Examiner*—Adolf Berhane
*Attorney, Agent, or Firm*—Coudert Brothers

[57] ABSTRACT

An improved electrical power converter is disclosed. The electrical power converter utilizes a pulse width modulator responsive to the voltage across a tertiary winding of the power transformer. The electrical power converter includes a feedback control circuit for providing a regulating voltage to the pulse width modulator that is substantially proportional to the voltage across the tertiary winding with the voltage spikes caused by any leakage inductance in said power transformer removed. The feedback control circuit includes a spike compensator circuit that utilizes leakage inductance produced voltage spikes to compensate for output voltage degradation due to heavy loads.

9 Claims, 2 Drawing Sheets

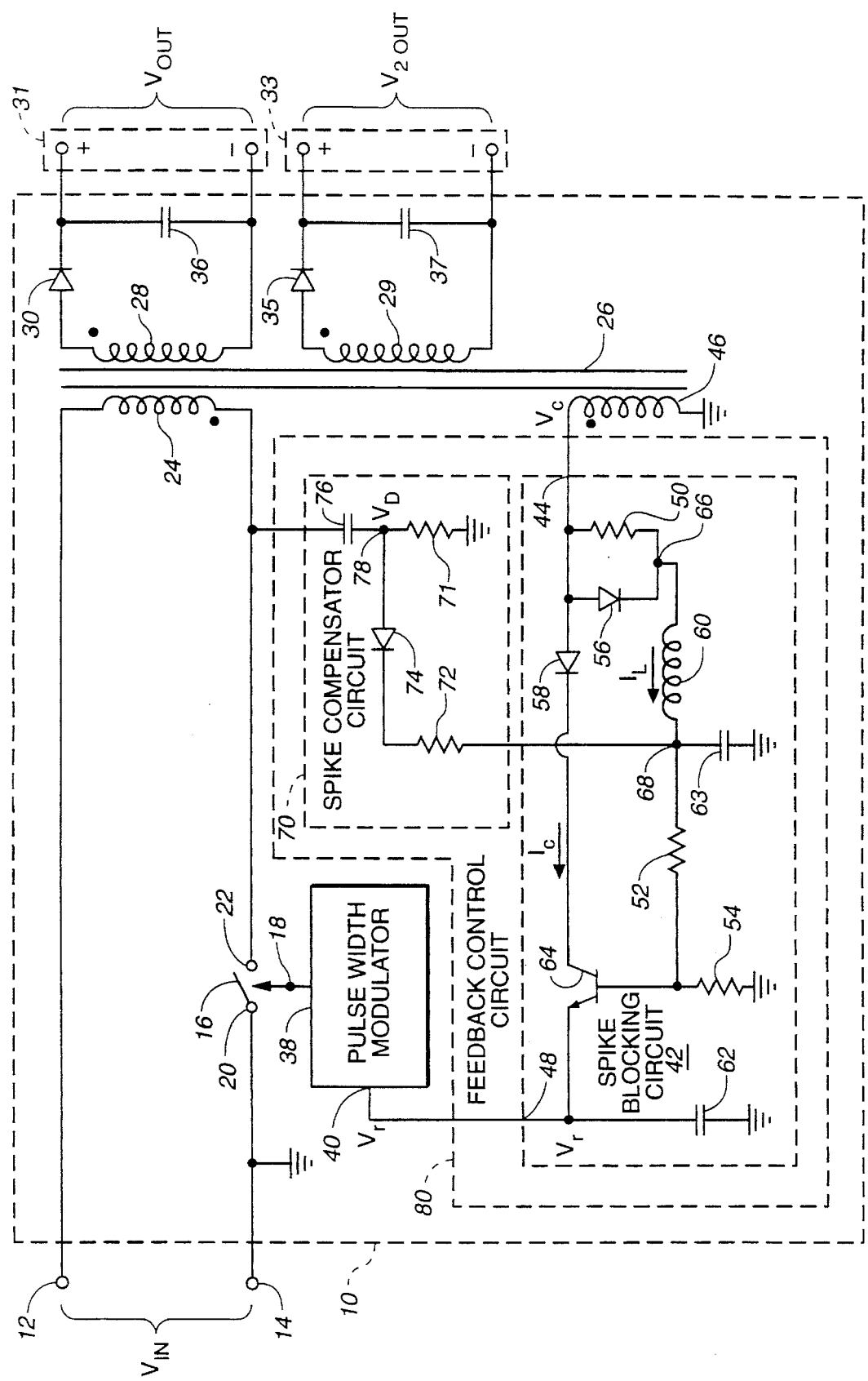
FIG._1

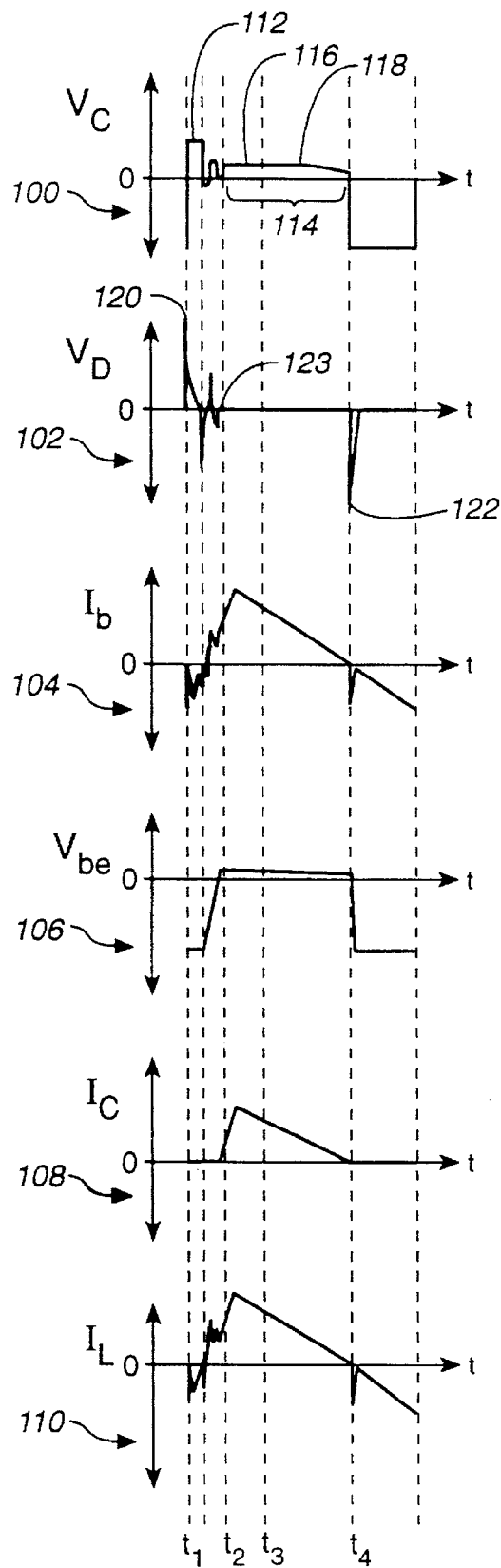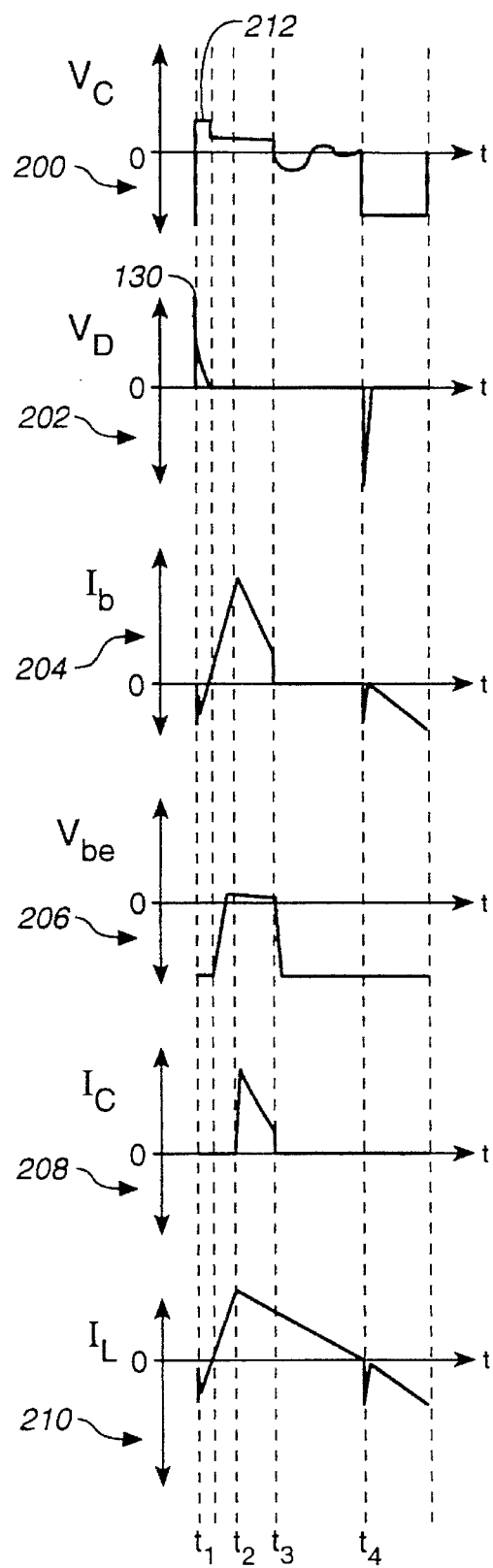
FIG._2   FIG._3

FLYBACK POWER CONVERTER WITH SPIKE COMPENSATOR CIRCUIT

FIELD OF THE INVENTION

The present invention relates to electrical power converters, and more particularly to flyback power converters having improved output voltage regulation.

BACKGROUND OF THE INVENTION

Electrical power converters are devices for processing electrical power from one form, such as an AC or unregulated DC voltage, into another form, such as one or more regulated DC output voltages. One conventional type of electrical power converter that produces a regulated output voltage is a switching power supply, also commonly referred to as a switch mode power supply or a switched power supply.

Conventional switching power supplies generally include a power switch, a power transformer, and a secondary filter circuit for each output of the converter. The power switch is used to alternately couple a DC or rectified AC voltage across a primary winding of the power transformer, thereby applying a series of square wave voltage pulses to the primary winding. The voltage pulses applied to the primary winding of the power transformer are transformed into a series of voltage pulses across one or more secondary windings. An output circuit for each converter output rectifies these voltage pulses, transferring their electrical energy to an output capacitor coupled to a converter output, which is typically coupled to a load. The power supply generally transfers sufficient energy to such output capacitor to maintain an appropriate output voltage level and supply necessary power to the loads associated therewith.

Regulation of the output voltages of a power converter generally is maintained by a pulse width modulator. Conventional pulse width modulators control the duration of the voltage pulses coupled to the primary winding of the power transformer, thereby controlling the amount of electrical energy transferred to the secondary side of the power transformer. To maintain a selected output voltage with light loads (i.e., loads drawing a relatively small amount of power), the power converter operates at a low duty cycle (i.e. short duration voltage pulses coupled to the power transformer) so that a relatively small amount of electrical energy is transferred to the output capacitors in a given time period. Conversely, for heavy loads (i.e., loads drawing a relatively large amount of power), the power converter operates at a high duty cycle (i.e., relatively long duration voltage pulses coupled to the power transformer) so that a relatively large amount of electrical energy is transferred to the output capacitors in a given time period.

One common type of switching power supply is referred to as a flyback power converter. In a conventional flyback power converter, rectifiers coupled to the secondary windings of the power transformer prevent current from flowing through the secondary windings when voltage is coupled across the primary winding. At the beginning of each switching cycle of a flyback power converter, the power switch turns on and couples a voltage across the primary winding. Consequently, current in the primary winding ramps up, thereby storing energy in the form of a magnetic field or flux in the power transformer. The period of time during which the power switch is on is referred to as the drive cycle or drive period. After the switch is turned off, the voltages across the secondary windings reverse, and the energy stored in the power transformer is released through the secondary windings and filtered to produce the desired output voltages. The period of time during which energy is released from the secondary windings is referred to as the flyback cycle or flyback period. After essentially all stored energy is released, the power switch is again turned on and the switching cycle repeats.

The pulse width modulator of a flyback power converter generally is responsive to a feedback voltage that is a function of the level of an output voltage. To generate an appropriate feedback voltage, the output voltage may be measured directly, provided isolation is maintained between the primary and secondary circuits of the converter. Alternatively, the output voltage may be measured by detecting the voltage across a tertiary winding of the power transformer. It is well known that a tertiary winding of a flyback power converter will have a voltage that is substantially proportional to the secondary winding voltages. The feedback voltage is typically rectified and filtered to produce a regulating voltage that is then coupled to the pulse width modulator. As described below, this feedback voltage is substantially proportional to the output voltages under normal or light load conditions.

It is generally preferable to obtain such a feedback voltage from a tertiary winding of the power transformer rather than by directly measuring an output voltage of a secondary winding. Using a tertiary winding eliminates the need for a separate isolation device (e.g. an opto-coupler or transformer), which would be necessary in the case of direct feedback to maintain isolation between the primary and secondary circuits of the converter. In addition to increasing component count, some isolation devices such as opto-couplers are undesirable in that they commonly cause reliability problems.

A key problem with obtaining the feedback voltage from a tertiary winding, however, is that output voltage regulation is degraded because power losses between the windings of the power transformer and the output terminals of the flyback converter are, in effect, transparent to the feedback mechanism. Under heavy load conditions, the forward voltage drop and recovery loss of the output rectifiers, the "copper losses" of the transformer and the printed circuit board conductors existing between the secondary winding and the output terminal, as well as other well known parasitic losses, are higher than at light loads. These losses result in output voltages that are lower under heavy load conditions.

Another problem that occurs when the feedback voltage is obtained from a tertiary winding is that transformer leakage inductance generally degrades the regulation of the output voltages by introducing a leading edge spike (or spikes) in each cycle of the feedback voltage across the tertiary winding. These spikes are followed by a voltage "plateau" that better represents the voltage across the secondary windings. As is well known, many common transformers used with flyback power supplies have relatively high leakage inductances due to the relatively poor magnetic coupling among the transformer's windings, and therefore such transformers generate high leading edge spikes in the voltage across their tertiary winding. Due to the spikes in the feedback voltage, the regulating voltage rises to a level that is higher than it should be for the actual output voltage level, providing inaccurate feedback to the pulse width modulator and resulting in poor regulation. Adequate regulation of the output voltage is even more difficult to achieve because the magnitudes of the leakage inductance spikes are proportional to the load current drawn from the power converter's output.

Thus, the effects of the spikes on regulation of the power converter's output voltages varies for heavy and light loads.

A variety of methods have been developed for reducing the effects of leakage inductance spikes on output voltage regulation where a tertiary winding is used to provide feedback. One way to reduce the effect of leakage inductance spikes on output voltage regulation is to filter the spike out of the tertiary voltage waveform. Filters capable of accommodating the necessary switching frequency, however, are generally complex and expensive.

Another way to reduce the effects of the tertiary voltage spikes is to place spike suppressing coupled inductors in the secondary and the tertiary circuits, as discussed in Leman, U.S. Pat. No. 5,008,794. However, the isolated coupled inductors required in Leman are also relatively expensive components and may be very complex in their construction. Leman also discusses a number of other ineffective means of dealing with leakage inductance spikes.

Finally, a spike "blanking" circuit may be used to eliminate the leakage inductance spikes. In such spike blanking circuits, a transistor switch between the tertiary winding and the pulse width modulator is open during the spike and closed during the "plateau" portion of the feedback voltage. Thus, the regulating voltage actually sensed by the pulse width modulator is not affected by the voltage spikes. As explained in Leman, such circuits have generally been considered undesirable because either a complex algorithm for controlling the opening and closing points of the switch is needed, or the power converter's load range must be restricted in order to provide an accurate regulating voltage to the pulse width modulator. Leman also notes that the analog switch action itself can introduce voltage spikes that affect the regulating voltage sensed by the pulse width modulator.

The above-described methods for dealing with leakage induction spikes have the further disadvantage that they do not provide means for dealing with the abovedescribed degradation of output voltage regulation that occurs under heavy load conditions. As noted above, output voltage regulation is degraded under heavy load conditions because the tertiary winding does not account for relatively large power losses in the secondary circuit.

Accordingly, there is a need for a flyback power converter that provides acceptable output voltage regulation under heavy and light load conditions and compensates for leakage inductance of the power transformer.

SUMMARY OF THE INVENTION

Broadly stated, the present invention encompasses an electrical flyback power converter, comprising an input port for receiving an input voltage and an output port; a power transformer having a primary winding, one or more secondary windings, and a tertiary winding; a power switch for alternately coupling said input voltage across said primary winding as a function of a periodic control signal coupled to said power switch, said input voltage coupled across said primary winding being transformed into voltages across said secondary and tertiary windings, wherein the voltages across each of said windings of said power transformer include voltage spikes; an output filter circuit coupled to each of said secondary windings for providing output voltages at each of said output ports, each said output circuit comprising a rectifier and a capacitor; a feedback control circuit for generating a regulating voltage at a feedback output that is substantially proportional to at least one of said output voltages, said feedback control circuit being responsive to a tertiary winding voltage across said tertiary winding, said feedback control circuit comprising a spike blocking means for preventing voltage spikes in said tertiary winding voltage from being coupled to said feedback output, and a spike compensator means for lowering the value of said regulating voltage under heavy load conditions; and a pulse width modulator, responsive to said regulating voltage, for generating said periodic control signal, the duration of which is set by the value of said regulating voltage.

In a preferred embodiment the spike blocking means includes a capacitor coupled to the pulse width modulator, the regulating voltage being stored on the capacitor, and a spike blocking switch for selectively enabling a control current to be conducted from the tertiary winding to the capacitor when the switch current is above a predetermined value; wherein the spike compensator means delays the turning on of the spike blocking switch.

Accordingly, a principal object of the present invention is to improve the regulation of the output voltage of an electrical power converter.

Another object of the present invention is to provide a flyback power converter that has adequate output voltage regulation under both heavy and light load conditions.

Still another object of the present invention is to provide a flyback electrical power converter whose output voltage is regulated by detecting the voltage across a tertiary winding of the converter's power transformer in a manner that is not adversely affected by voltage spikes in the tertiary winding voltage caused by leakage inductance of the transformer.

Yet another object of the present invention is to provide a flyback power converter having an output voltage regulation circuit that compensates for increased parasitic losses under heavy load conditions.

A further object of the present invention is to provide a low cost means of eliminating the adverse effects of leakage inductance spikes on output voltage regulation in a flyback power converter.

These and other objects of the present invention will become apparent to those skilled in the art from the following detailed description of the preferred embodiments, the accompanying drawings, and the appended claims.

BRIEF DESCRIPTION OF THE DRAWINGS

FIG. 1 is a combined block and circuit diagram showing an exemplary flyback power converter with a spike compensator circuit according to the present invention.

FIG. 2 is a timing diagram showing exemplary voltages and currents of a flyback power converter according to the present invention during heavy load conditions.

FIG. 3 is a timing diagram showing exemplary voltages and currents of a flyback power converter according to the present invention under light load conditions.

DETAILED DESCRIPTION OF THE INVENTION AND PREFERRED EMBODIMENTS

A combined block and circuit diagram of a preferred embodiment of a flyback electrical power converter 10 according to the present invention is shown in FIG. 1. Flyback power converter 10 includes a pulse width modulator 38 that is responsive to the flyback voltage across a tertiary winding 46 of the power transformer for regulating the converter's output voltage. Power converter 10 includes a feedback control circuit 80 for providing a regulating voltage to the pulse width modulator 38. The regulating voltage is stored on a capacitor 62 that is charged by the voltage across the tertiary winding. The feedback control circuit 80 prevents leakage inductance produced voltage spikes from being coupled to capacitor 62. The feedback control circuit 80 also includes a spike compensator circuit 70 that utilizes leakage inductance produced voltage spikes to compensate for converter output voltage degradation under heavy load conditions.

Power converter 10 receives an input voltage $V_{in}$, which is preferably a DC voltage produced by rectifying and filtering an AC line voltage in a conventional manner. Input voltage $V_{in}$ is coupled across input terminals 12 and 14 of power converter 10. In the illustrated embodiment, the potential at input terminal 14 also defines a ground reference potential.

Electrical power converter 10 further includes a power switch 16 and a power transformer 26 having a primary winding 24, secondary windings 28 and 29, and a tertiary winding 46. Power switch 16 and primary winding 24 are coupled in series between input terminals 12 and 14. More specifically, input power switch 16 has a control terminal 18 and two conduction terminals 20 and 22. Terminal 20 of power switch 16 is coupled to input terminal 14. Terminal 22 of power switch 16 is coupled to one end of primary winding 24 of power transformer 26 (the dotted end shown in FIG. 1). The other end of primary winding 24 is coupled to input terminal 12.

When power switch 16 is in a conductive ON state, input voltage $V_{in}$ is coupled across primary winding 24 thereby causing current to be conducted through primary winding 24 and energy to be stored in power transformer 26 during the drive cycle of electrical power converter 10. The energy stored in power transformer 26 is coupled to secondary windings 28 and 29 during the flyback cycle of electrical power converter 10, when power switch 16 is switched to a non-conductive OFF state. During each flyback cycle, a positive voltage exists across windings 28, 29 and 46 from the dotted to the undotted ends.

The illustrated secondary circuits rectify and filter the voltages across windings 28 and 29 to produce output voltages $V_{out}$ and $V_{2out}$ at output ports 31 and 33, respectively. More specifically, a rectifier 30 is coupled between the dotted end of winding 28 and the positive terminal of output port 31, which is indicated with a "+" symbol. The other end of winding 28 is coupled to the negative terminal of output port 31, indicated with a "−" symbol. A storage capacitor 36 is coupled between the positive and negative terminals of output port 31. Output port 31 is coupled to an external load (not shown). In a similar manner, rectifier 35 and capacitor 37 are coupled to winding 29 and output port 33, providing a second output voltage $V_{2out}$.

As a result of transformer action, the voltage across secondary windings 28 and 29 are of a polarity such that rectifiers 30 and 35 become forward biased during non-conducting intervals of power switch 16 (that is, during flyback cycles). During a flyback cycle of power converter 10, secondary windings 28 and 29 supply output currents which are conducted, respectively, through rectifiers 30 and 35. Consequently, the energy stored in power transformer 26 is transferred to output ports 31 and 33 and capacitors 36 and 37. During a drive cycle of power converter 10, the voltages across secondary windings 28 and 29 are of a polarity such that rectifiers 30 and 35 become reversed biased, and the output voltages $V_{out}$ and $V_{2out}$ are maintained by storage capacitors 36 and 37.

Periodic switching on and off of power switch 16 occurs in response to a control signal periodically generated by a conventional pulse width modulator 38. Pulse width modulator 38 is responsive to a regulating voltage $V_r$ received at an input 40. As explained further below, regulating voltage $V_r$ is substantially proportional to output voltage $V_{out}$. In a conventional manner, pulse width modulator 38 varies the pulse width of the control signal as a function of the value of the regulating voltage so as to control the duration of the voltage pulses coupled across primary winding 24. As a result, output voltage $V_{out}$ is regulated about a selected voltage level. Second output voltage $V_{2out}$ is also regulated in that it is also proportional to $V_{out}$, a well known feature of flyback power converters Regulating voltage $V_r$ is produced by a feedback control circuit 80, which comprises a spike blocking circuit 42 and a spike compensator circuit 70. Regulating voltage $V_r$ is stored on capacitor 62. Capacitor 62 is charged by the control voltage $V_c$ across tertiary winding 46. Voltage $V_r$ is substantially proportional to output voltage $V_{out}$.

Spike blocking circuit 42 prevents control voltage $V_c$ from charging up capacitor 62 during the time any leakage inductance spikes appear across winding 46. Spike blocking circuit 42 has an input 44 coupled to one end of winding 46. The other end of tertiary winding 46 is preferably coupled to the ground reference potential. Voltage $V_c$ is produced across tertiary winding 46 and is substantially proportional to the voltage across secondary winding 28.

Spike blocking circuit 42 comprises resistors 50, 52 and 54, rectifiers 56 and 58, inductor 60, capacitors 62 and 63, transistor 64, and nodes 66 and 68. Resistor 50 is coupled between input 44 and node 66. Transistor 64 preferably is a bipolar junction transistor (BJT) having a base, an emitter and a collector terminal. It is within ordinary skill in the art to substitute a MOSFET or other switching device for the BJT according to the present invention. Inductor 60 is coupled between nodes 66 and 68. Resistor 52 is coupled between node 68 and the base of transistor 64. Resistor 54 is coupled between the base of transistor 64 and the ground reference potential. Rectifier 58 is coupled between input 44 and the collector of transistor 64 such that current is enabled to be conducted through rectifier 58 substantially only in the direction from input 44 to transistor 64. The emitter of transistor 64 is coupled to output 48 and one plate of capacitor 62, the other plate of capacitor 62 being coupled to the ground reference potential. Capacitor 63 is coupled between node 68 and the ground reference potential and stores a voltage at node 68 as described further herein. A rectifier 56 is preferably also coupled between input 44 and node 66, and functions as hereinafter described.

When power switch 16 is off (i.e., during the flyback cycle of electrical power converter 10), the voltage of the dotted terminal of tertiary winding 46 is positive and rectifier 58 is forward biased. The inductor current $I_L$ through inductor 60 increases until it provides sufficient base current and voltage at the base of transistor 64 to turn on transistor 64. When transistor 64 is turned on, a control current $I_C$ is conducted from tertiary winding 46 to capacitor 62, causing the regulating voltage $V_r$, which is stored on capacitor 62, to increase. Rectifier 56 is optional, and allows current $I_L$ to increase at a faster rate by bypassing resistor 50.

When power switch 16 is on (i.e., during the drive cycle of electrical power converter 10), the voltage of the dotted terminal of tertiary winding 46 is negative, and rectifier 58 is reverse biased. Thus, no current is conducted from tertiary winding 46 to capacitor 62. During the drive cycle, inductor current $I_L$ decreases and flows from resistor 52 through inductor 60 and resistor 50, thereby discharging capacitor 63.

It will be appreciated that the values of resistors 50–54, capacitor 63, and inductor 60 determine the length of time necessary for transistor 64 to turn on as a result of a given voltage being induced across tertiary winding 46, and these values may be chosen such that the initial voltage spikes in the tertiary winding voltage produced by leakage inductance are prevented from being coupled to capacitor 62 and pulse width modulator 38.

As explained further below, spike compensator circuit 70 further adjusts the turn-on time of transistor 64 to account for power losses in the secondary circuit under heavy load conditions. Spike compensator circuit 70 is coupled between the dotted end of primary winding 24 and node 68 of spike blocking circuit 42. As explained further below, spike compensator circuit 70 produces voltage spikes at node 68 which, under heavy load conditions, delay the turning on of transistor 64.

Spike compensator circuit 70 comprises resistors 71 and 72, rectifier 74, capacitor 76, and node 78. Capacitor 76 is coupled between the dotted end of primary winding 24 and node 78. Resistor 71 is coupled between node 78 and the ground reference potential. Rectifier 74 and resistor 72 are coupled in series between node 78 and node 68 such that current is enabled to be conducted substantially only in the direction from node 78 to node 68.

The operation of spike compensator circuit 70 in combination with spike blocking circuit 42 is explained below in relation to timing diagrams 100 through 110 of FIG. 2 and timing diagrams 200 through 2 10 of FIG. 3.

Referring now to FIG. 2, the control voltage $V_c$ across tertiary winding 46 is shown in timing diagram 100 under heavy output load conditions. At time $t_1$, the flyback cycle of electrical power converter 10 commences. Control voltage $V_c$ initially rises in a relatively large voltage spike 112 due to the leakage inductance of power transformer 26. Voltage spike 112 is followed by a series of smaller voltage spikes and a voltage plateau 114 from time $t_2$ to time $t_4$. The number of spikes and their magnitude increases as the load increases. For simplicity, only a few spikes are shown. Voltage plateau 114 is arbitrarily divided into a first region 116, from time $t_2$ to time $t_3$, and a second region 118, from time $t_3$ to time $t_4$. As is well known, the voltage of voltage plateau 114 decreases from time $t_2$ to time $t_4$. Thus, the average value of control voltage $V_c$ is higher in region 116 than in region 118.

The waveform for control voltage $V_c$ under light load conditions is shown in timing diagram 200. In the case of light output loads, as seen in timing diagram 200, voltage $V_c$ is similar, except that the leakage inductance voltage spike 212 has a smaller magnitude and the subsequent spikes are negligible. In addition, there is some ripple voltage during region 118.

Referring back to timing diagram 100 of FIG. 2, from time $t_1$ to time $t_2$, transistor 64 is off, with the result that voltage spike 112 and the subsequent spikes are not coupled to capacitor 62. At time $t_2$, transistor 64 is permitted to turn on in the manner explained above and to remain on until time $t_4$. Thus, after transistor 64 is turned on, voltage plateau 114 is coupled to capacitor 62. This is true under both heavy and light load conditions.

In the absence of spike compensator circuit 70, capacitor 62 would quickly charge to a voltage equal to a voltage level within region 116, under both heavy load and light load conditions. During heavy loads, however, output voltage $V_{out}$ will tend to be lower than at light loads, due to switching power losses of rectifier 30, "copper loss" of power transformer 26 and other copper traces on the PC board, and other well-known parasitic power losses. Thus, in the absence of spike compensator circuit 70, the regulating voltage provided to pulse width modulator 38 will not be representative of the true output voltage under heavy load conditions. Thus, compensation must be provided for these power losses so that pulse width modulator 38 can accurately regulate the output voltage.

Spike compensator circuit 70 is designed to compensate for this undesired output voltage reduction at heavy loads by delaying the turning on of transistor 64 and the current flowing through transistor 64 such that capacitor 62 will only charge up to a voltage level within the voltage range of lower voltage region 118 of voltage plateau 114 (less the voltage drop across rectifier 58 and transistor 64), rather than higher voltage region 116. As explained above, plateau 114 has a decreasing slope and control voltage $V_c$ is therefore lower during region 118 than it is during region 116. Thus, regulating voltage $V_r$ will be lower during heavy loads, and pulse width modulator 38, in a conventional manner, will cause output voltage $V_{out}$ to increase more than if regulating voltage $V_r$ were higher. This output voltage increase serves to compensate for parasitic power losses.

To accomplish this function, spike compensator circuit 70 makes use of the leakage inductance produced spike in the voltage at the dotted terminal of primary winding 24 which, as is well known, is substantially proportional to the load current being drawn from output terminal 34. While spike compensator circuit 70 is shown as using the voltage spikes from winding 24, it will be appreciated by those skilled in the art that such spikes may be derived from any other windings with suitable magnitudes.

The voltage $V_D$ across resistor 71 is shown in timing diagram 102 in FIG. 2 and timing diagram 202 in FIG. 3 under heavy and light load conditions, respectively. As shown in timing diagram 102 of FIG. 2, voltage $V_D$ will have both positive spikes, such as spike 120, and negative spikes, such as spike 122, as a result of the voltage spikes coupled through capacitor 76 from primary winding 24. In addition, under heavy load conditions, a number of additional positive and negative spikes occur, as shown at 123 in diagram 102. The positive spikes are coupled through rectifier 74 to resistor 72. Rectifier 74 prevents the negative spikes from being coupled to resistor 72, although there is some reverse leakage current through rectifier 74, passing a portion of the negative spikes. The spikes are coupled through resistor 72, which reduces the magnitude of the spikes coupled to node 68.

Under heavy load conditions, the positive and negative spikes coupled to node 68 divert energy from inductor 60 and slow the rise in base current $I_b$ to transistor 64, thereby delaying the turning on of transistor 64 and lowering the control current $I_c$ when transistor 64 is turned on. Capacitor 62, therefore, is charged up to a lower voltage within the range of voltages in region 118. Thus, under heavy load conditions, pulse width modulator 38 will sense a lower regulating voltage $V_r$ and will cause a corresponding increase in the output voltage $V_{out}$, which compensates for the parasitic losses under heavy loads.

The base current $I_b$, base-emitter voltage $V_{bc}$, and control current $I_c$ through transistor 64 under heavy load conditions is shown in diagrams 104, 106, and 108, respectively. The inductor current $I_L$ under heavy load conditions is shown in diagram 110.

Under light load conditions, as illustrated in the timing diagrams of FIG. 3, only the positive voltage spike 130 is coupled to node 68. Rather than delaying the turning on of transistor 64, this actually increases the base current $I_b$ of transistor 64, allowing transistor 64 to turn on more quickly and more control current $I_c$ to be conducted when transistor 64 is initially turned on. The base current $I_b$, base-emitter voltage $V_{be}$ and control current $I_c$ through transistor 64 under light load conditions are shown in diagrams 204, 206 and 208, respectively. The inductor current $I_L$ under light load conditions is shown in timing diagram 210.

Due to the quick turn on of transistor 64 and the large control current $I_c$ through transistor 64, under light load conditions capacitor 62 is quickly charged up to a higher voltage within the range of voltages in region 116. Thus, under light load conditions, pulse width modulator 38 will sense a relatively higher regulator voltage $V_r$.

Exemplary component values used in the feedback control circuit 80 according to the present invention as shown in FIG. 1 are provided in the following table:

| Reference No. | Function Block | Component values and type |
|---|---|---|
| 71 | Spike | 1 KΩ 5%, 3 W, carbon film or equiv. |
| 72 | Compensator circuit 70 | 18 KΩ 5%, ¼ W carbon film or equiv. |
| 74 | | Silicon Diode, BAV-20, Vpeak > 150 V or equiv. |
| 76 | | Capacitor ceramic 100 pF 5%, 1 KV or equiv. |
| 50 | Spike | 15 KΩ 5%, ⅙ W carbon film or equiv. |
| 52 | Blocking | 1 KΩ 5%, ⅙ W carbon film or equiv. |
| 54 | circuit 42 | 8 KΩ 5%, ⅙ W carbon film or equiv. |
| 56, 58 | | Silicon Diode, 1N4606 or equiv. |
| 60 | | Low power inductor, 3.9 mH @ 50 mA. |
| 62 | | 3.3 uF to 10 uF/25 V electrolytic capacitor or equiv. |
| 63 | | 100 to 120 pF 50 V ceramic capacitor or equiv. |
| 64 | | NPN small signal transistor, Vce > 100 V, β > 150. |

While the present invention has been particularly described with respect to the illustrated embodiments, it will be appreciated that various alterations, modifications, and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, to the contrary, is intended to cover various modifications and equivalent arrangements that are within the scope of the appended claims.

What is claimed is:

1. An electrical power converter, comprising:

an input port for receiving an input voltage and an output port;

a power transformer having a primary winding, one or more secondary windings, and a tertiary winding;

a power switch for alternately coupling said input voltage across said primary winding as a function of a periodic control signal coupled to said power switch, said input voltage coupled across said primary winding being transformed into voltages across said secondary and tertiary windings, wherein the voltages across each of said windings of said power transformer include voltage spikes;

an output circuit coupled to each of said secondary windings for providing output voltages at each of said output ports, each said output circuit comprising a rectifier and a capacitor;

a feedback control circuit for generating a regulating voltage at a feedback output that is substantially proportional to at least one of said output voltages, said feedback control circuit being responsive to a tertiary voltage across said tertiary winding, said feedback control circuit comprising a spike blocking means for preventing voltage spikes in said tertiary voltage from being coupled to said feedback output, and a spike compensator means for lowering the value of said regulating voltage under heavy load conditions; and a pulse width modulator, responsive to said regulating voltage, for generating said periodic control signal, the duration of which is set by the value of said regulating voltage.

2. The electrical power converter of claim 1, wherein said electrical power converter is a flyback power converter.

3. An electrical power converter, comprising:

an input port for receiving an input voltage and an output port;

a power transformer having a primary winding, one or more secondary windings, and a tertiary winding;

a power switch for alternately coupling said input voltage across said primary winding as a function of a periodic control signal coupled to said power switch, said input voltage coupled across said primary winding being transformed into voltages across said secondary and tertiary windings, wherein the voltages across each of said windings of said power transformer includes voltage spikes;

an output circuit coupled to each of said secondary windings for providing output voltages at each of said output ports, each said output circuit comprising a rectifier and a capacitor;

a feedback control circuit for generating a regulating voltage at a feedback output that is substantially proportional to at least one of said output voltages, said feedback control circuit being responsive to a tertiary voltage across said tertiary winding, said feedback control circuit comprising a spike blocking means for preventing voltage spikes in said tertiary voltage from being coupled to said feedback output, and a spike compensator means for lowering the value of said regulating voltage under heavy load conditions; and a pulse width modulator, responsive to said regulating voltage, for generating said periodic control signal, the duration of which is set by the value of said regulating voltage, said spike blocking means comprising:

a capacitor coupled to said pulse width modulator, said regulating voltage being stored on said capacitor;

a spike blocking switch having a switch terminal responsive to a switch current, said spike blocking switch selectively enabling a control current to be conducted from said tertiary winding to said capacitor when said switch current is above a predetermined value; and switch current conduction means, coupled between said switch terminal and said tertiary winding and responsive to the value of said tertiary voltage, for enabling conduction of said switch current from said tertiary winding to said switch terminal, said switch current conduction means preventing said switch current from reaching said predetermined value for a time period during which a voltage spike in said tertiary voltage occurs.

4. The electrical power converter of claim 3, wherein said spike blocking switch is a bipolar transistor and said switch terminal is the base of said bipolar transistor.

5. The electrical power converter of claim 3, wherein said switch current conduction means comprises an inductor for delaying the conduction of switch current from said tertiary winding to said switch terminal, said inductor having a first end and a second end, said switch current from said tertiary winding being conducted to said first end of said inductor.

6. The electrical power converter of claim 5, wherein said spike compensator means comprises a circuit for coupling a voltage spike to said second end of said inductor such that the rate of increase of said switch current is slowed under heavy load conditions.

7. The electrical power converter of claim 6, wherein said spike compensator means is coupled between said primary winding and said second end of said inductor.

8. A flyback power converter, comprising:

an input port for receiving an input voltage and one or more output ports;

a power transformer having a primary winding, one or more secondary windings, and a tertiary winding;

a power switch for alternately coupling said input voltage across said primary winding, said power switch having a first conduction terminal, a second conduction terminal, and a control terminal that enables electrical current to be conducted between said first conduction terminal and said second conduction terminal when a sufficient voltage is coupled to said control terminal, said input voltage coupled across said primary winding being transformed into voltages across said secondary and tertiary windings, wherein the voltages across each of said windings of said power transformer include voltage spikes;

a rectifier coupled to each of said secondary windings such that current is substantially prevented from being conducted through said secondary windings when said input voltage is coupled across said primary winding;

an output filter circuit coupled to each of said secondary windings for providing output voltages to said output ports;

a feedback control means for providing a regulating voltage that is substantially proportional to at least one of said output voltages and has substantially no voltage spikes caused by leakage inductance in said power transformer;

a spike compensator means for lowering the value of said regulating voltage when a heavy load is coupled to at least one of said output ports; and a pulse width modulator, responsive to said regulating voltage, for providing a series of voltage pulses to said control terminal such that said power switch is turned on and off in a series of switching cycles.

9. The electrical power converter of claim 1, wherein said power switch comprises a first conduction terminal, a second conduction terminal, and a control terminal that enables electrical current to be conducted between said first conduction terminal and said second conduction terminal when a sufficient voltage is coupled to said control terminal, said control terminal being responsive to said periodic control signal.

* * * * *